United States Patent [19]
Ohtsuka et al.

[11] 3,977,009
[45] Aug. 24, 1976

[54] INFORMATION RECORDING WITH AN ORGANIC COMPOUND CAPABLE OF ASSUMING TWO OR MORE CONVERTIBLE STABLE AGGREGATION STATES

[75] Inventors: Shyuichi Ohtsuka; Seiichi Taguchi, both of Asaka, Japan

[73] Assignee: Fuji Photo Film Co., Ltd., Minami-ashigara, Japan

[22] Filed: Sept. 12, 1974

[21] Appl. No.: 505,293

[30] Foreign Application Priority Data
Sept. 12, 1973   Japan.............................. 48-102213

[52] U.S. Cl............................. 346/74 R; 204/274; 340/173 CH; 350/160 R; 350/160 P
[51] Int. Cl.²................. G01D 15/10; G11C 11/28; H05B 37/00
[58] Field of Search................. 346/74 EL, 74 R, 1; 204/2, 4, 5, 274, 308; 350/160 R, 160 P, 267; 340/173 CH

[56] References Cited
UNITED STATES PATENTS

| | | |
|---|---|---|
| 3,322,482 | 5/1967 | Harmon............................ 350/267 |
| 3,451,742 | 6/1969 | Marks................................ 350/267 |
| 3,559,190 | 1/1971 | Bitzer........................... 340/173 CH |
| 3,573,542 | 4/1971 | Mayer........................... 340/173 CH |
| 3,853,785 | 12/1974 | Labes................................ 350/160 |

*Primary Examiner*—Alfred H. Eddleman
*Assistant Examiner*—Jay P. Lucas
*Attorney, Agent, or Firm*—Sughrue, Rothwell, Mion, Zinn & Macpeak

[57] ABSTRACT

A recording method which comprises selectively applying a DC or AC electric field to a layer of a recording medium on a support, the recording medium comprising at least one organic compound capable of assuming two or more convertible aggregation states at the same temperature, thereby selectively converting the initial aggregation state of the organic compound to which the field is applied into another aggregation state or hindering the converting of the initial aggregation state of the organic compound into another aggregation state.

15 Claims, 6 Drawing Figures

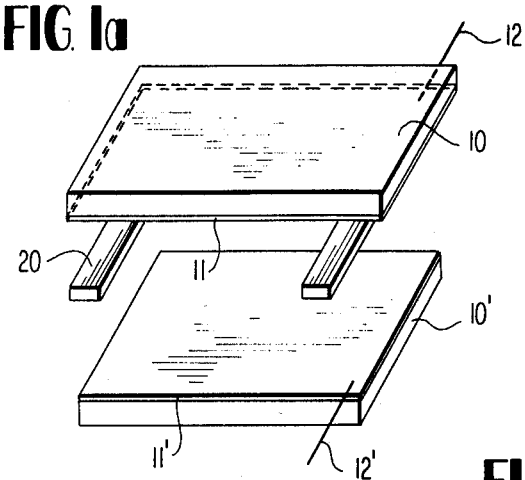
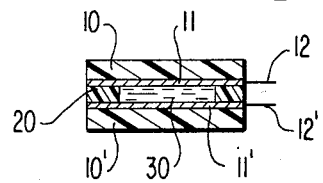
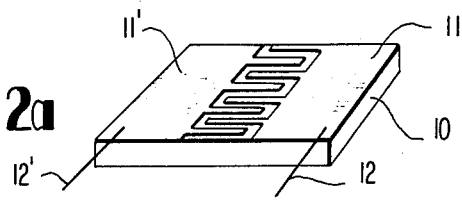
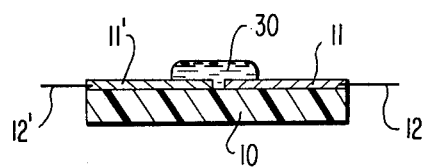
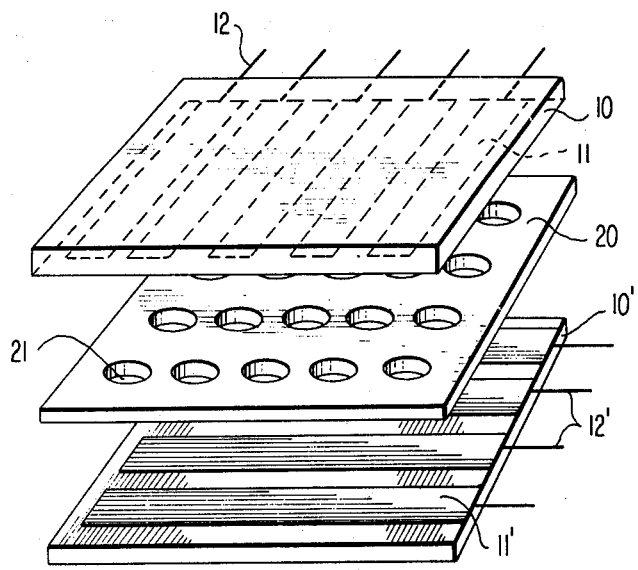
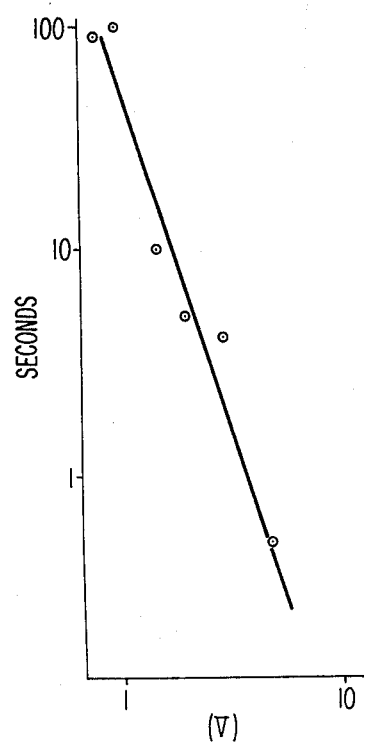

INFORMATION RECORDING WITH AN ORGANIC COMPOUND CAPABLE OF ASSUMING TWO OR MORE CONVERTIBLE STABLE AGGREGATION STATES

BACKGROUND OF THE INVENTION

1. Field of the Invention

This invention relates to a method of recording information and more particularly, it is concerned with a recording method using a recording medium comprising at least one organic compound capable of assuming two or more convertible states of aggregation (hereinafter, "aggregation states") at the same temperature.

2. Description of the Prior Art

Up to the present time, as a method of recording electric signals, methods using magnetic materials, liquid crystals, electrolytic coloring and glasses of calcogens are known.

The present invention provides a new recording method which is different from these prior recording methods and which uses different compounds.

SUMMARY OF THE INVENTION

In accordance with the method of the invention, recording is carried out by applying a DC or AC electric field to a recording medium comprising at least one organic compound capable of assuming two or more aggregation states at the same temperature, thereby converting the initial aggregation state of the recording medium into another aggregation state or hindering the conversion of the initial aggregation state to another aggregation state. This recording is based on the ability to detect a difference between the aggregation state of the recording medium where an electric field is applied and the aggregation state of the recording medium to which no electric field is applied using an electric, optical, physical or chemical method. Furthermore, this recording can be erased by heating with the recording medium returning to the initial aggregation state or the difference in the aggregation states of the recording medium can be fixed by a chemical or physical treatment.

BRIEF DESCRIPTION OF THE DRAWINGS

FIG. 1 shows a method of combining a sandwich type electrode and the recording medium in accordance with the present invention, in which FIG. 1a is a perspective view and FIG. 1b is a cross sectional view.

FIG. 2 shows a method of combining a surface type electrode and recording medium in accordance with the present invention, in which FIG. 2a is a perspective view and FIG. 2b is a cross sectional view.

FIG. 3 shows another embodiment of the present invention, in which a number of recording media are arranged on the same base plate.

FIG. 4 shows the correlation between the applied voltage and the voltage application time required for recrystallization in the present invention.

DETAILED DESCRIPTION OF THE INVENTION

The organic compound capable of assuming two or more aggregation states at the same temperature, used in this invention, can be converted from one aggregation state to another aggregation state by application of an electric field or the application of this electric field can hinder this conversion. Examples of organic compounds having such property are organic compounds having a melting point of from about 15° to 250°C, preferably 40° to 150°C, and showing sufficient supercooling effects and organic compounds soluble in a liquid and existing as a liquid, a supercooled liquid or a glassy state at a temperature of about 250°C or lower and exhibiting a supersaturated state with a decrease of the temperature. ΔT represented by the following equation is considered as the quantity representative of the supercooled or supersaturated condition:

$$\Delta T = Tm - T$$

In this equation, $Tm$ is the temperature at which the crystal phase and the liquid phase of the organic compound are in thermo-dynamic equilibrium, corresponding to the melting point in the case of the former organic compound exhibiting supercooling, or corresponding to the saturation point in the case of the latter organic compound exhibiting supersaturation. $T$ is the temperature at which recording is carried out. The organic compound used in the present invention exhibits supercooling or supersaturation in the range of a ΔT of 1°C or larger, preferably a ΔT of 5° to 25°C.

Conversion of the aggregation state in the present invention means that, for example, the above described recording medium in a supercooled state is crystallized by applying an electric field and hindrance of this conversion of the aggregation state means that, for example, the recording medium in a supercooled state is crystallized by reducing the temperature to some extent, but this crystallization can be begun at a higher temperature by applying an electric field to the system than would be the case where no electric field is applied. Thus, by selectively applying an electric field to areas of the recording medium a difference in the aggregation state characteristics can be achieved and an image formed as a result of this difference.

The organic compound of the invention can be chosen from aromatic amines, aromatic hydrocarbons, aromatic phenols and naphthols, aromatic ketones and quinones, aromatic heterocyclic compounds, aromatic and aliphatic amides, aromatic aldehydes and aromatic and aliphatic carboxylic acids. Specific examples of these compounds are aromatic amines such as tribenzylamine, N-vinylcarbazole, N-ethylcarbazole, N-phenylcarbazole, triphenylamine, phenylenediamine, diphenylamine and diaminodiphenyl; aromatic hydrocarbons such as diphenyl, naphthalene, stilbene, fluorene, triphenylene, triphenylmethane, anthracene, and pyrene; aromatic phenols and naphthols such as vanillin, thymol, and α-naphthol, ketones and quinones such as benzoin, benzophenone, 2,4-dihydroxybenzophenone, naphthoquinone, phenanthraquinone, p-benzoquinone, benzyl, anthrone, fluorenone and 2,3-benzofluorenone aromatic heterocyclic compounds such as benzotriazole and 7,8-benzoquinoline; aromatic and aliphatic amides such as benzamide, acrylamide and acetoacrylamide; aromatic aldehydes such as o-phthalaldehyde and aromatic and aliphatic carboxylic acids such as behenic acid, stearic acid and benzoic anhydride. Compounds outside the above described classifications but also suitable include the urethanes. These organic compounds can be used individually or in combination of two or more. When using the above described compounds as the organic compound exhibiting supersaturation, as the organic compound in a liquid, supercooled liquid or glassy state at a temperature of 250°C or lower, that is, as a solvent there can be present, in addition to the above described organic compounds, thermoplastic high molecular weight materials, for example, polyolefins such as polyethylene and polypropylene, vinyl and vinylidene resins such as polymethyl methacrylate and polyvinylcarbazole, polyamides, polyurethanes, polypeptides, polysulfides, polycarbonates, cellulose polymers, polysulfones, phenol resins, amino resins and silicone resins, and conventional solvents, for example, alcohols such as ethyl alcohol and methyl alcohol, ketones such as acetone, esters such as ethyl acetate and butyl acetate, ethers such as diethyl ether, aromatic hydrocarbons such as toluene, xylene and benzene, aliphatic hydrocarbons such as cyclohexane and n-hexane, and chlorinated and nitrated hydrocarbons such as chloroform, carbon tetrachloride, chlorobenzene and nitrobenzene. These solvents can be used individually or in combination.

The recording medium used in the invention includes at least one organic compound capable of assuming two or more aggregation states at the same temperature and, moreover, includes a compound which is rendered capable of assuming two or more aggregation states at the same temperature through combination with a suitable solvent, e.g., benzamide and polystyrene or benzyl and benzophenone.

In combination with the above described organic compounds, furthermore, a material facilitating the conversion response from one aggregation state to another aggregation state or enhancing the hindrance of such a conversion (which will hereinafter be referred to as a sensitizer) can be used. This material responds to an electric signal and serves to promote the formation of a difference between the aggregation states of the foregoing organic compound.

The sensitizer which can be used in the invention in general can be an alkali metal halide, a metal halide, an alkali metal salt, a silver salt, a triphenylmethane dye, a diphenylmethane dye, a xanthene dye, an azo dye, a thiazine dye, an acridine dye, a quinoline dye and a nitro dye. Specific examples of alkali metal halides are potassium iodide, potassium bromide, potassium chloride, potassium fluoride, sodium iodide, sodium bromide, sodium fluoride, lithium iodide, lithium bromide and lithium chloride. Specific examples of metal halides are lead iodide, lead bromide, lead chloride, copper iodide, copper bromide, copper chloride, tin iodide, tin bromide, tin chloride, indium iodide, indium bromide and indium chloride. Illustrative examples of alkali metal salts are potassium hydrogen phosphate ($KH_2PO_4$), lithium niobate ($LiNbO_3$), potassium oxalate, sodium oxalate, lithium oxalate, potassium hydrogen oxalate, sodium hydrogen oxalate, lithium hydrogen oxalate, potassium chromate, sodium chromate, potassium bichromate, sodium bichromate, potassium hydrogen phthalate, sodium hydrogen phthalate, potassium sulfate, sodium sulfate, potassium nitrate, sodium nitrate, potassium thiosulfate, sodium thiosulfate, potassium iodate, sodium iodate, potassium phosphate, sodium phosphate, sodium pyrophosphate, sodium pyrophosphate, potassium carbonate, sodium carbonate, potassium hydrogen carbonate, and sodium hydrogen carbonate. Suitable examples of silver salts are silver iodide, silver bromide, silver chloride, silver phosphate and silver malonate. Specific examples of dyes are Acid Blue 9 (C.I. 42090) and Mordant Blue 3 (C.I. 43820) for the triphenylmethane dye, Basic Yellow 2 (C.I. 41000) for the diphenylmethane dye, Acid Red 51 (C.I. 45430) and Solvent Red 45 (C.I. 45386) for the xanthene dye, Acid Orange 52 (C.I. 13025), Direct Violet 28 (C.I. 23685), Mordant Brown 33 (C.I. 13250) and Mordant Black 11 (C.I. 14645) for the azo dye, Basic Yellow 1 (C.I. 49005) and Basic Blue 9 (C.I. 52015) for the thiazine dye, Basic Orange 14 (C.I. 46005) for the acridine dye, Acid Yellow 3 (C.I. 47005) for the quinoline dye and Acid Orange 3 (C.I. 10385) for the nitro dye. These sensitizers can be used individually or in admixture. These sensitizers can be used in admixture with the organic compound capable of assuming two or more aggregation states at the same temperature of incorporated in a layer adjacent the layer containing the organic compound capable of assuming two or more aggregation states at the same temperature, with both layers being provided on a support. The quantity of the sensitizer used generally ranges from about 1 to 1/100,000 parts by weight, preferably 1/10 to 1/200 parts by weight per part by weight of the organic compound capable of assuming two or more aggregation states at the same temperature.

In the recording method of the invention, application of an electric signal to the above described recording medium can be carried out using an electrode having a good electric conductivity. Metallic electrodes and indium oxide or tin oxide formed on a sheet of glass, which is known as a transparent electrode, can be used as the electrode in the recording method of the invention. Typical examples of metallic electrodes are gold, platinum, silver, aluminum, copper and chromium plated or vapor-deposited on metal sheets, metal wires and base plates. The base plate is ordinarily made of glass, ceramic or plastics such as polyethylene, polyethylene terephthalate and polystyrene.

A number of methods of combining the electrodes and the recording medium of the invention can be used in the method of the invention and typical combinations are shown in the accompanying drawings.

Referring to FIGS. 1a and 1b the assembly employs the so-called sandwich type electrodes and in FIGS. 2a and 2b, the assembly employs the so-called surface type electrodes. 10 and 10' are base plates of glass, plastic or ceramic and 11 and 11' are transparent electrodes or metallic electrodes. As the occasion demands, base plates 10 and 10' can be omitted. 12 and 12' are lead wires, for example, copper wires to provide electrodes 11 and 11' with electric signals. Electrodes 11 and 11' having a surface resistance of about 1000 $\Omega/cm^2$ or less are suitable for the recording method of the invention. Spacer 20 in FIG. 1 serves to keep the interval between electrodes 11 and 11' constant. The spacer desirably is a spacer of glass, mica, Teflon, polystyrene, polyethylene, or polyethylene terephthalate having a high resistance (e.g., about $10^{10}\Omega cm$ or more). The interval between electrodes 11 and 11' is ordinarily about 1 $\mu m$ to 1 mm, preferably 50 $\mu m$ to 200 $\mu m$. 30 is a recording medium comprising the organic compound capable of assuming two or more aggregation states at the same temperature according to the present invention. FIG. 3 shows another embodiment wherein a number of recording media are arranged on the same base plate. In this case, spacer 20 contains holes 21 of a diameter of about 0.5 mm or more, in which recording media are positioned for recording.

The electric signal used in the invention can be provided by a DC electric field, an AC electric field or a combination of a DC electric field and an AC electric field. In an AC electric field, a low frequency of about 1 KHz or less can be used. The application time of the electric field required for converting the initial aggregation state to the other aggregation state of the recording medium of the invention varies with the applied voltage, temperature, shape of electrode, kind of recording medium and distance between electrodes. However, electric charges of about $10^{-9}$ coulomb or more should be passed. For example, conversion of the aggregation state of the recording medium can be carried out by applying an AC or DC voltage of from about 0.1 to 1000 V for about 0.0001 second to $10^4$ seconds, preferably 1 second to 100 seconds.

The recording of the invention is carried out by heating the recording medium to Tm or higher to return the recording medium to the initial aggregation state before applying an electric signal, keeping the recording medium at Tm or higher, preferably 5° to 10°C higher, for several minutes then cooling the recording medium gradually to Tm or lower to provide a supercooled or supersaturated state and applying an electric signal; or by applying an electric signal to the recording medium while keeping the recording material at Tm or higher and then cooling the recording medium gradually to Tm or lower.

The detection of the recorded image obtained by the recording method according to the present invention can be carried out as follows. Any method of detecting a difference between the aggregation states of the recording medium can be employed, for example, electric methods, optical methods, physical methods and chemical methods. For example, electric methods which are suitable utilize the difference in the electric resistances and the dielectric constants, optical methods utilize the difference in optical densities and degrees of light scattering, physical methods utilize the difference in viscosities and chemical methods utilize the difference of reaction velocities in chemical reactions.

The recording method of the invention can be carried out as a dry process method and erasing of the recorded image or additional recording is also possible.

The following examples are given in order to illustrate the invention in greater detail. The invention should not be construed as being limited to these specific examples. Unless otherwise indicated, all parts, percents, ratios and the like are by weight.

EXAMPLE 1

Benzophenone and potassium iodide were mixed in a proportion of 20 : 1 by weight, pulverized in a mortar to obtain fine grains of about 0.05 mm or less and then inserted as a mass of several mg between two transparent electrodes (tin oxide formed on a sheet of glass) provided with a spacer of polyethylene terephthalate of a thickness of 100 microns. The assembly was heated to 54°C, then cooled gradually to 43°C to form a supercooled state and kept at this temperature. When a DC electric field was applied to a portion of the mass for a certain period of time and no DC electric field was applied another portion of the mass, the mass to which the DC electric field was applied crystallized after several tens of seconds and the mass not subjected to the DC electric field remained in a supercooled state. The relation between the voltage applied to the two electrodes with a separation of 100 microns and the voltage application time required for the crystallization of 100% of the mass is shown in FIG. 4 wherein the abscissa is the applied voltage and the ordinate is the voltage application time.

The sample crystallized by applying an electric field was again heated at 54°C and melted to erase the recorded image. This sample was again cooled again to form a supercooled state, and could be again subjected to recording as described above.

A sample supercooled but not subjected to an electric field was transparent, while a crystallized sample appeared white due to scattering of light. Since the transmission of light was reduced by a factor of from one to several times to one to several tens of times, the difference between the crystallized state and supercooled state could be detected optically.

EXAMPLE 2

The procedure of Example 1 was repeated except that the temperature at which a DC electric field was applied was adjusted to 45.5°C. When the voltage was 10 V, a voltage application time of 180 seconds was necessary for crystallization and, when the voltage was 50 V, a voltage application time of 70 seconds was necessary. When this sample was further cooled gradually to 30°C or lower, all portions of the mass including those portions to which no electric field had been applied were crystallized.

EXAMPLE 3

The procedure of Example 1 was repeated except that an electrode comprising a sheet of glass upon which silver had been vapor deposited was used in place of the transparent electrode. When the voltage was 5 V, the crystallization was completed in 1 second. The change in the electric current was used to determine whether crystallization took place or not. $1 \times 10^{-4}$ A/20 V under supercooled state changed into $2 \times 10^{-7}$ A/20 V with the crystallization. This change in the electric current can be utilized in switching applications

EXAMPLE 4

This example was carried out using the sample described in Example 1 and the surface type electrode as shown in FIG. 2. The electrode was prepared by vapor deposition of silver in vacuum on a base plate of glass through a mask. The sample was heated at 54°C, melted and cooled gradually to 43°C. When an electric field of 500 V was applied for 30 seconds, crystallization took place.

A dye of Solvent Red 27 powder was scattered on this sample and, after 30 seconds, the sample was inverted to remove the dye on the surface. The dye diffused through the interior of the supercooled mass, to which no voltage was applied and colored the mass, while the mass crystallized by application of the voltage was only slightly colored. When the reflection optical density was measured, a density difference of 1 or more was found between the supercooled mass and crystallized mass. When the temperature was further reduced to room temperature, the mass to which no electric signal was applied was also crystallied but the density difference formed by the dye remained.

EXAMPLE 5

Benzophenone and potassium iodide were mixed in a proportion of 1000 : 1 by weight, pulverized in a mixing mortar to obtain fine grains of about 0.05 mm or less and then a supercooled state of 43°C was formed in a manner analogous to Example 1, to which an AC electric field was applied. When an AC electric field of 10 V was applied for 30 seconds, crystallization was found with an AC frequency of 20 Hz, 30 Hz, 50 Hz or 70 Hz. With a frequency of 90 Hz or 100 Hz, application of the voltage for 2 minutes resulted in crystallization, but, with a frequency of 150 Hz or 200 Hz, no crystallization was found even when the voltage was applied for 20 minutes or longer.

EXAMPLE 6

The response to application of a DC voltage was evaluated using compounds other than potassium iodide as a sensitizer in a manner analogous to Example 1. The voltage application time required for crystallization is shown in Table I.

TABLE I

| Sensitizer | Applied Voltage (V) | Application Time (seconds) |
|---|---|---|
| NaI (0.1%)* | 5 | 3 |
| LiCl (0.1%) | 10 | 1 |
| KBr (1%) | 20 | 5 |
| PbI$_2$ (5%) | 20 | 10 |
| CuI (5%) | 10 | 30 |
| AgBr (5%) | 5 | 10 |
| Potassium Dihydrogen Phosphate (10%) | 40 | 3 |
| Sodium Pyrophosphate (5%) | 30 | 10 |
| Potassium Bichromate (10%) | 30 | 60 |
| Potassium Iodate (5%) | 40 | 100 |
| Sodium Carbonate (3%) | 40 | 200 |
| Potassium Hydrogen Phthalate (10%) | 40 | 100 |
| Silver Acetate (5%) | 40 | 200 |
| Silver Malonate (10%) | 50 | 100 |
| Basic Blue 9 (0.1%) | 10 | 5 |
| Solvent Red 45 (0.1%) | 10 | 50 |
| Direct Violet 28 (0.1%) | 50 | 100 |
| Acid Orange 52 (0.5%) | 30 | 100 |
| Acid Yellow 3 (0.5%) | 10 | 30 |

*percentage by weight of sensitizer to benzophenone

EXAMPLE 7

Benzyl and a sensitizer were mixed in a proportion of 20:1 by weight, pulverized in a mortar to obtain fine grains of a diameter of about 0.05 mm or less and then inserted individually as grains in the form of a mass of several mg between two transparent electrodes (tin oxide formed on a sheet of glass) provided with a spacer of a thickness of 100 microns in a manner similar to Example 1. A polyethylene film was used as the spacer. The assembly was heated at 105°C and then cooled gradually to 88°C to form a supercooled state to which a DC voltage was applied. The kinds of the sensitizers used and the voltage application time required for crystallization are tabulated in Table II.

Table II

| Sensitizer | Applied Voltage (V) | Application Time (seconds) |
|---|---|---|
| LiCl (1%)* | 10 | 5 |
| KI (0.01%) | 10 | 5 |
| PbBr$_2$ (5%) | 10 | 10 |

*percentage by weight to benzyl

EXAMPLE 8

Diphenylamine and potassium dihydrogen phosphate (KDP) were mixed in a proportion of 100:1 by weight and processed in a manner analogous to Example 7 to prepare a sample. The sample was heated and melted at 60°C and then cooled gradually to 45°C to form a supercooled state to which a DC voltage was applied. Crystallization occurred. The applied voltage was 500 V and the application time was 3 minutes.

EXAMPLE 9

A similar procedure to Example 7 was carried out on combinations of other organic compounds exhibiting supercooling with potassium iodide as a sensitizer. The organic compound and the potassium iodide were mixed in a proportion of 20:1 by weight and processed in a manner analogous to Example 7 to prepare a sample. The sample was heated at a temperature of 5°C higher than the melting point of the organic compound to melt the organic compound and then cooled gradually to a temperature of 10°C lower than the melting point to form a supercooled state to which a DC voltage was applied. The voltage application time required for crystallization is shown in Table III.

Table III

| Organic Compound | Applied Voltage (V) | Application Time (seconds) |
|---|---|---|
| Diphenyl | 40 | 600 |
| N-Vinylcarbazole | 40 | 150 |
| α-Naphthoquinone | 10 | 10 |
| Benzohydrol | 50 | 700 |
| 7,8-Benzoquinoline | 100 | 100 |
| Benzamide | 10 | 100 |

EXAMPLE 10

Naphthalene, benzyl and potassium iodide were mixed in a proportion of 100 : 100 : 1 by weight and processed in a manner analogous to Example 7 to prepare a sample. The sample was heated at 100°C to form a uniform liquid and then cooled gradually to 60°C to form a supercooled state. A DC voltage of 100 V was applied to part of the sample for 30 seconds. Crystals were deposited and this portion of the sample became heterogeneous. On the other hand, the remaining portion of the sample to which no voltage was applied remained uniform and liquid.

EXAMPLE 11

Polystyrene softening at 125°C, benzamide and potassium iodide were mixed in a proportion of 60 : 40 :

1 by weight and processed in a manner analogous to Example 7 to prepare a sample. The sample was heated at 130°C to form a uniform liquid and then cooled gradually to 100°C to form a supercooled state. When a DC voltage of 10 V was applied to a portion of the sample for 150 seconds, deposition of crystals occurred. On the other hand, the remaining portion to which the voltage was not applied remained uniform and liquid.

While the invention has been described in detail and with reference to specific embodiments thereof, it will be apparent to one skilled in the art that various changes and modifications can be made therein without departing from the spirit and scope thereof.

What is claimed is:

1. A recording method which comprises selectively applying an electric field to a layer of a recording medium on a support, the recording medium comprising at least one organic compound capable of assuming two or more convertible stable aggregation states at the same temperature, to selectively convert the initial aggregation state of the organic compound to which the field is applied into another aggregation state or hindering the converting of the initial aggregation state of the organic compound into another aggregation state and thereafter removing the electric field.

2. The recording method of claim 1, including a sensitizer facilitating the conversion of the initial aggregation state of the organic compound to another aggregation state or enhancing the hindrance of the conversion of the initial state of the organic compound to another aggregation state.

3. The recording method of claim 2, wherein said sensitizer is a metal salt, a triphenylmethane dye, a diphenylmethane dye, a xanthene dye, an azo dye, a thiazine dye, an acridine dye, a quinoline dye, or a nitro dye.

4. The recording method of claim 3, wherein the amount of said sensitizer ranges from about 1 to 1/10000 parts by weight per part by weight of said organic compound.

5. The recording method of claim 1, wherein said organic compound is a compound having a melting point of about 15°C to 250°C and capable of existing in a supercooled state.

6. The recording method of claim 1, wherein said organic compound is an aromatic amine, an aromatic hydrocarbon, a phenol, a naphthol, an aromatic ketone, a quinone, an aromatic heterocyclic compound, an aromatic amide, an aliphatic amide, an aromatic aldehyde, an aromatic carboxylic acid, or an aliphatic carboxylic acid.

7. The recording method of claim 1, wherein the electric field has a voltage of from about 0.1 to 1000 V and the applying of the electric field is for at least about 0.0001 second.

8. The recording method of claim 1, wherein said organic compound is a compound soluble in a liquid and existing as a liquid, a supercooled liquid or a glassy state at a temperature of about 250°C or lower and capable of exhibiting a supersaturated state.

9. A recording medium comprising at least one organic compound capable of assuming two or more convertible aggregation states at the same temperature and converting from a supercooled or supersaturated state to a crystal state or being hindered in the conversion from a supercooled or supersaturated state to a crystal state by an electric field.

10. The recording medium of claim 9, further including a sensitizer facilitating the converstion from a supercooled or supersaturated state to a crystal state of the organic compound to another aggregation state or enhancing the hindrance of the conversion from a supercooled or supersaturated state to a crystal state.

11. The recording medium of claim 10, wherein said sensitizer is a metal salt, a triphenylmethane dye, a diphenylmethane dye, a xanthene dye, an azo dye, a thiazine dye, an acridine dye, a quinoline dye, or a nitro dye.

12. The recording medium of claim 11, wherein the amount of said sensitizer ranges from about 1 to 1/10,000 parts by weight per part by weight of said organic compound.

13. The recording medium of claim 9, wherein said organic compound is a compound having a melting point of about 15°C to 250°C and capable of existing in a supercooled state.

14. The recording medium of claim 9, wherein said organic compound is a compound soluble in a liquid and existing as a liquid, a supercooled liquid or a glassy state at a temperature of about 250°C or lower and capable of exhibiting a supersaturated state.

15. The recording medium of claim 9, wherein said organic compound is an aromatic amine, an aromatic hydrocarbon, a phenyl, a napthol, an aromatic ketone, a quinone, an aromatic heterocyclic compound, an aromatic amide, an aliphatic amide, an aromatic aldehyde, an aromatic carboxylic acid, or an aliphatic carboxylic acid.

* * * * *